C. M. DURNELL.
PLOWSHARE HOLDER.
APPLICATION FILED SEPT. 26, 1908.
920,442.
Patented May 4, 1909.
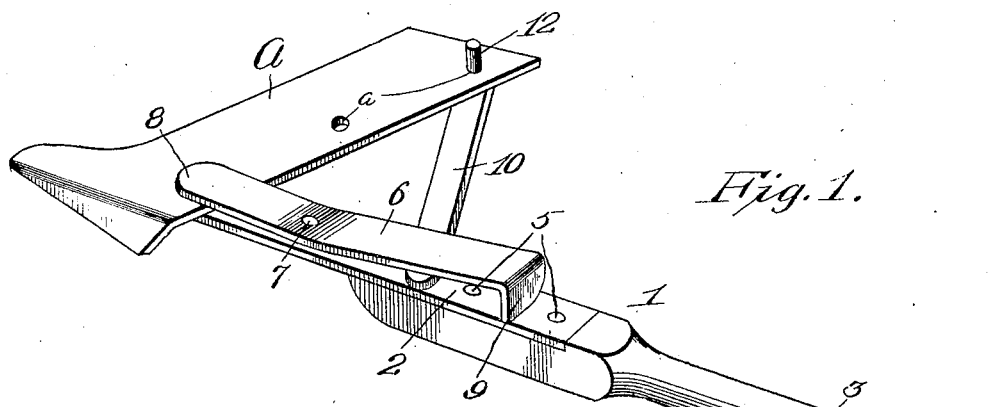
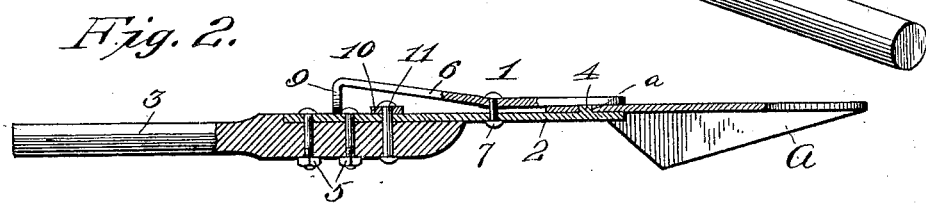
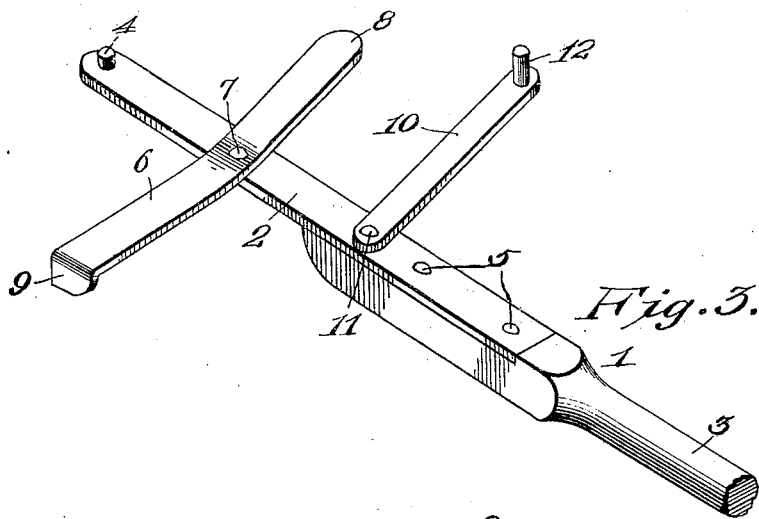
Witnesses
James F. Crown
Nina L. Martin
Inventor
Cecil M. Durnell
By Watson E. Coleman
Attorney

UNITED STATES PATENT OFFICE.

CECIL M. DURNELL, OF CAMP BRANCH, MISSOURI, ASSIGNOR TO MILTON S. BOTTS, OF CAMP BRANCH, MISSOURI.

PLOWSHARE-HOLDER.

No. 920,442.　　　Specification of Letters Patent.　　　Patented May 4, 1909.

Application filed September 26, 1908. Serial No. 454,841.

*To all whom it may concern:*

Be it known that I, CECIL M. DURNELL, a citizen of the United States, residing at Camp Branch, in the county of Pettis and State of Missouri, have invented certain new and useful Improvements in Plowshare-Holders, of which the following is a specification, reference being had to the accompanying drawings.

This invention is a device for holding plow shares or lays while being sharpened and consists of the novel features of construction and the combination and arrangement of parts hereinafter fully described and claimed.

The object of the invention is to provide a simple, practical and inexpensive device of this character which may be quickly and easily engaged with and disengaged from a plow share or the like and which will permit the same to be effectively held while being sharpened or ground.

The above and other objects of the invention are attained in its preferred embodiment illustrated in the accompanying drawings, in which—

Figure 1 is a view showing the invention applied to a plow share; Fig. 2 is a longitudinal section; and Fig. 3 is a perspective view of the holder removed from the plow share.

In the drawings A denotes a plow share or lay formed with the usual openings $a$ for attaching bolts or similar fastenings and 1 denotes the improved holder. The latter comprises a body member or bar 2 provided at one end with a handle 3 and at its other end with a stud 4 adapted to enter one of the openings $a$ in the plow share. Said handle 3 may be formed integral with the body bar 2 but, as illustrated, it is constructed of wood and secured to the same by bolts or similar fastenings 5. The stud 4 is adapted to be retained in said opening in the plow share by a resilient locking member 6 which is in the form of a strip of resilient metal pivoted intermediate its ends, as at 7, upon the body bar 2 and having an end 8 adapted to be swung over the plow share and the stud 4 so as to retain the former upon the latter. The opposite end of the resilient locking member 6 is bent at right angles and has one of its corners rounded to provide a cam 9 which engages the body bar 2 when the end 8 of the locking member is disposed over the stud 4, so as to cause said end 8 to bear with greater pressure upon the plow share, said pivotal connection 7 being comparatively loose so that the resilient locking member will be bowed when in its operative position, as shown more clearly in Fig. 2 of the drawings. In order to prevent the plow share from swinging around upon the stud 4, a bracing member 10 is provided. The latter is in the form of a link pivoted at one end, as shown at 11, upon the body bar 2 and provided at its other end with a stud 12 adapted to enter one of the other of the openings $a$ in the plow share.

In applying the invention to a plow share, the outer end of the body bar 2 is engaged with one face of the plow share and its stud 4 inserted in one of the openings $a$, while the free end of the link 10 is engaged with the same face of the share and its stud 12 arranged in one of the other of said openings $a$. The resilient locking member 6 is then swung upon its pivot 7 so that its free end 8 engages the opposite face of the plow share and holds the stud 4 in the latter. When this is done, the cam projection or lug 9 will slip up upon the body bar 2 and bow the locking member 6 so that the device will more effectively retain the plow share upon it.

From the foregoing it will be seen that the invention provides an exceedingly simple and inexpensive device which may be quickly and easily engaged with and disengaged from a plow share or any other similar object which is to be held while being sharpened or otherwise operated upon or manipulated.

Having thus described the invention what is claimed is:

1. A device of the character described comprising a body having a handle at one end and means at its other end to engage a seat or opening in an object, a transverse pivot on said body intermediate its ends, a locking member pivoted intermediate its ends on said pivot and adapted to swing in a plane substantially parallel with the longitudinal axis of the body, one end of said locking member being adapted to swing over said seat engaging means on the handle to retain an object in engagement with said means, a transversely arranged cam on the other end of said locking member to frictionally engage the body and retain said locking member in its operative position, and a brace or stay carried by the body and adapted to engage the object.

2. A device of the character described comprising a body having a handle and means to engage a seat or opening in an object, a resilient locking member loosely fulcrumed intermediate its ends upon the body and having a cam projection at one end to engage the body and to bow said member, to cause its other end to engage the object and retain it upon said means, and a brace or stay carried by the body and adapted to engage the object.

3. A device of the character described, comprising a body-bar having a handle at one end and a stud at its other end, a resilient locking member loosely fulcrumed intermediate its ends to the body bar and having a cam projection at one end adapted to engage the body-bar and to press the other end of said member toward said stud, and a bracing link pivoted to the body-bar and provided at its other end with a stud.

In testimony whereof I hereunto affix my signature in the presence of two witnesses.

CECIL M. DURNELL.

Witnesses:
  MILTON S. BOTTS,
  JAMES S. REAM.